United States Patent
Chen

(10) Patent No.: US 6,373,469 B1
(45) Date of Patent: Apr. 16, 2002

(54) RADIO FREQUENCY COMPUTER MOUSE

(75) Inventor: Cheng Hsiung Chen, Taipei (TW)

(73) Assignee: Dexin Corporation, Taipei Hsien (TW)

( * ) Notice: Subject to any disclaimer, the term of this patent is extended or adjusted under 35 U.S.C. 154(b) by 0 days.

(21) Appl. No.: 09/370,874

(22) Filed: Aug. 10, 1999

(51) Int. Cl.[7] .............................................. G06F 17/00
(52) U.S. Cl. ....................... 345/163; 345/156; 345/158; 345/177
(58) Field of Search ................................ 345/156, 158, 345/163, 177

(56) References Cited

U.S. PATENT DOCUMENTS 6,301,513 B1 * 10/2001 Divon et al. .................. 700/94

* cited by examiner

Primary Examiner—Bipin Shalwala
Assistant Examiner—Vincent E. Kovalick
(74) Attorney, Agent, or Firm—Rosenberg, Klein & Lee

(57) ABSTRACT

A RF computer mouse has a track ball mechanism a control IC, and a simplified RF transmitter using ASK modulation for sending signal. The RF transmitter comprises a high-frequency transistor, an LC high frequency suppressing circuit, an emitter resistor, a surface acoustic wave device and an LC circuit with matched impedance with antenna. The simplified RF transmitter uses surface acoustic wave device as oscillator source and sends the signal of the control IC through the high-frequency transistor. The use of the surface acoustic wave device can simplify the RF transmitter circuit, thus eliminating calibration step, simplifying manufacture and enhancing yield.

5 Claims, 4 Drawing Sheets

RADIO FREQUENCY COMPUTER MOUSE

FIELD OF THE INVENTION

The present invention relates to a radio frequency (RF) computer mouse, more particularly, to an RF computer mouse which uses a simple RF transmitter circuit having surface acoustic wave (SAW) device to generate carrier frequency and employing amplitude-shift keying (ASK) modulation, thus eliminating calibration step, simplifying manufacture and enhancing yield.

BACKGROUND OF THE INVENTION

The conventional computer mouse is generally connected to the computer through connection wire. The use of mouse may be inconvenient due to the length imitation of the connection wire.

The infrared (IR) mouse is developed to provide wireless operation. However, the IR mouse is a directive device, it can not be placed at arbitrary direction to the computer.

The RF computer keyboard is developed to overcome above problem by providing wireless and omni-directional operation However, the RF keyboard has the problem of complicated circuit and high cost, which may block the buyer.

It is the object of the present to provide a user-attractive wireless computer mouse, which is advantageous in cost stability and yield.

To achieve the above objects, the present invention provides a computer mouse, which uses a simple RF transmitter circuit having surface acoustic wave (SAW) device to generate carrier frequency and employing amplitude-shift keying (ASK) modulation, thus eliminating calibration step, simplifying manufacture and enhancing yield.

The various objects and advantages of the present invention win be more readily understood from the following detailed description when read in conjunction with the appended drawing, in which:

DETAIL DESCRIPTION OF PREFERRED EMBODIMENT

Figure 1:
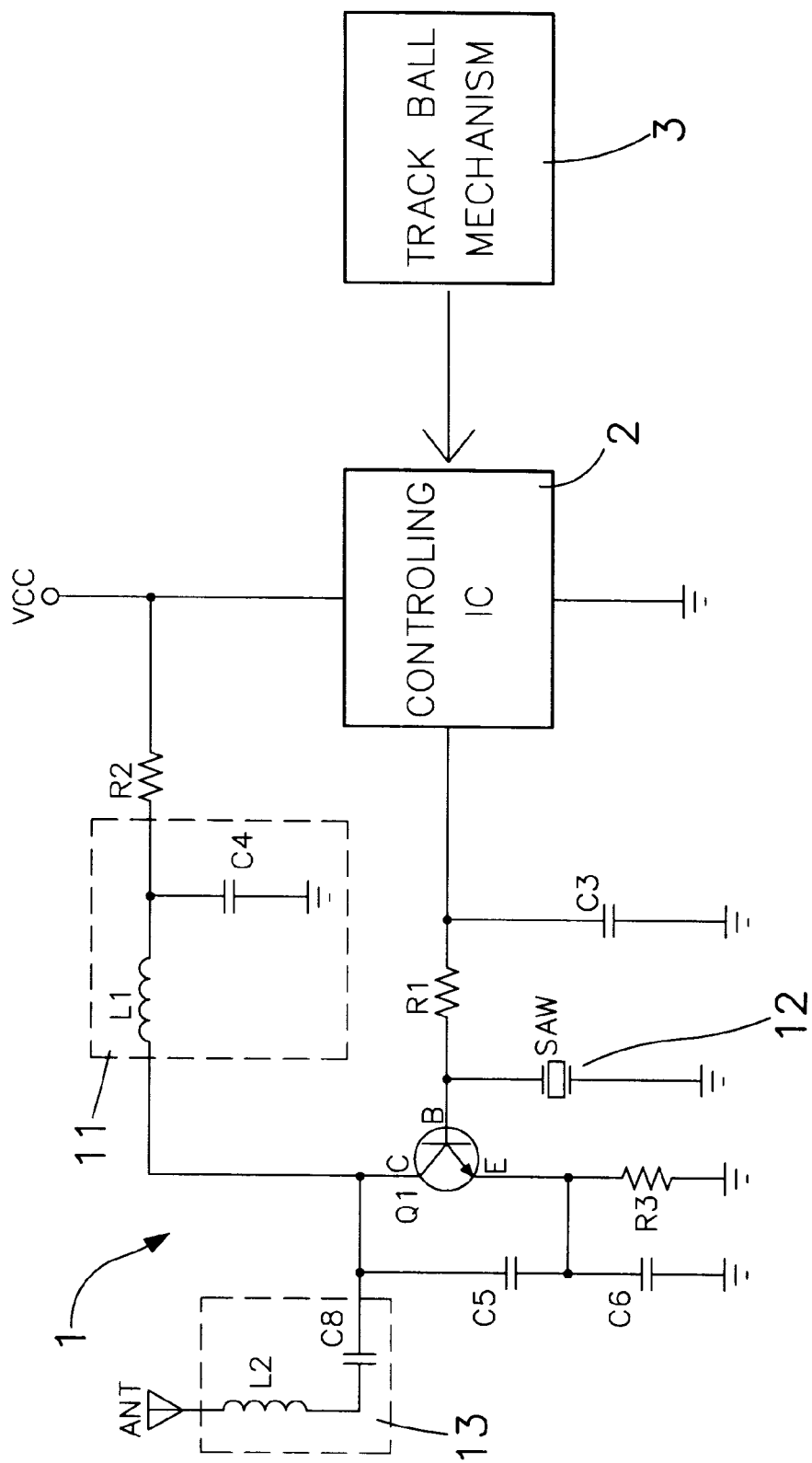
FIG. 1 is the circuit diagram of the RF transmitter according to an embodiment of the present invention.
Figure 2:
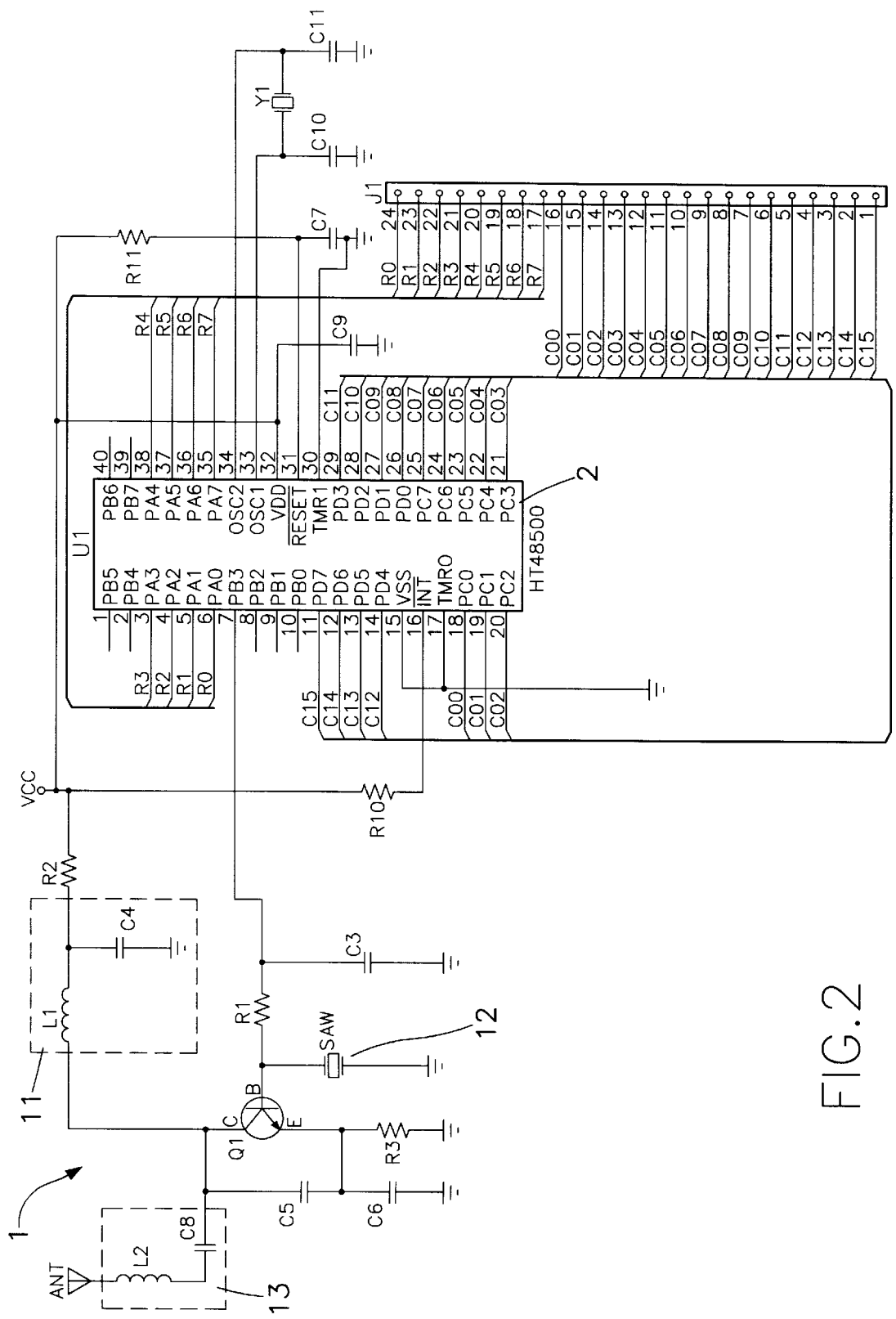
FIG. 2 is the circuit diagram of the RF transmitter shown in FIG. 1 in connection with a controlling IC.

As shown in FIGS. 1 and 2, the RF computer mouse according to the first embodiment of the invention comprises a tracking ball means and an RF transmitter 1. The RF transmitter 1 uses ASK (amplitude shin keying) modulation and comprises a transistor Q1, an LC high frequency suppressing circuit 11, an emitter resistor R3, a surface acoustic wave (SAW) device 12 and an LC circuit component 13.

More particular, the base of the transistor Q1 is connected to the SAW device 12 and connected, through a current-limiting resistor R1 and a capacitor C3 to a controlling IC 2, which comprises a microprocessor U1, resistors R10, R11, capacitors C7, C9–C11 and crystal oscillator Y1. The input of the controlling IC 2 is connected to the track ball mechanism 3.

The collector of the transistor Q1 is connected to the voltage source Vcc through the LC high-frequency suppressing circuit 11, and the collector voltage is fed to the antenna ANT through the LC circuit 13 comprising an inductor L2 and a capacitor C8.

The emitter of the transistor Tr is connected to ground through an emitter resistor Re which determine the magnitude of current flowing through the oscillator, and determine the power of transmitting signal.

The bias of the transistor Q1 is controlled by the output of the controlling IC 2. When the output of the controlling IC 2 is in high state, the transistor Q1 is on and transmits signal with carrier frequency generated by the SAW device 12; otherwise, the transistor Q1 is off and no signal is generated.

The transmitter 1 uses the SAW device 12 as source of oscillation and sends the output signal of the controlling IC 2 through the transistor Q1.

Figure 3:
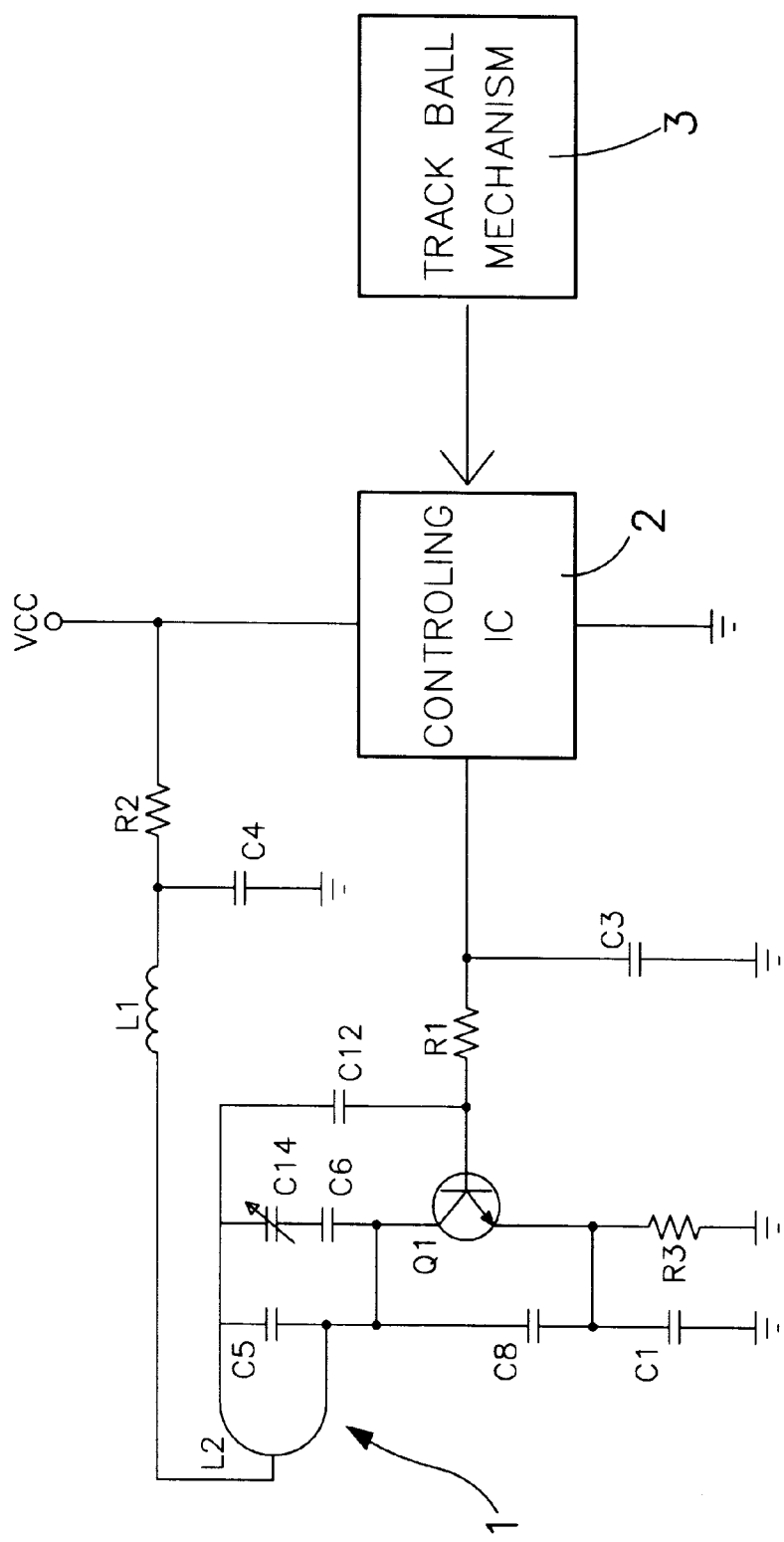
FIG. 3 is the circuit diagram of the RF transmitter according to another embodiment of the present invention.
Figure 4:
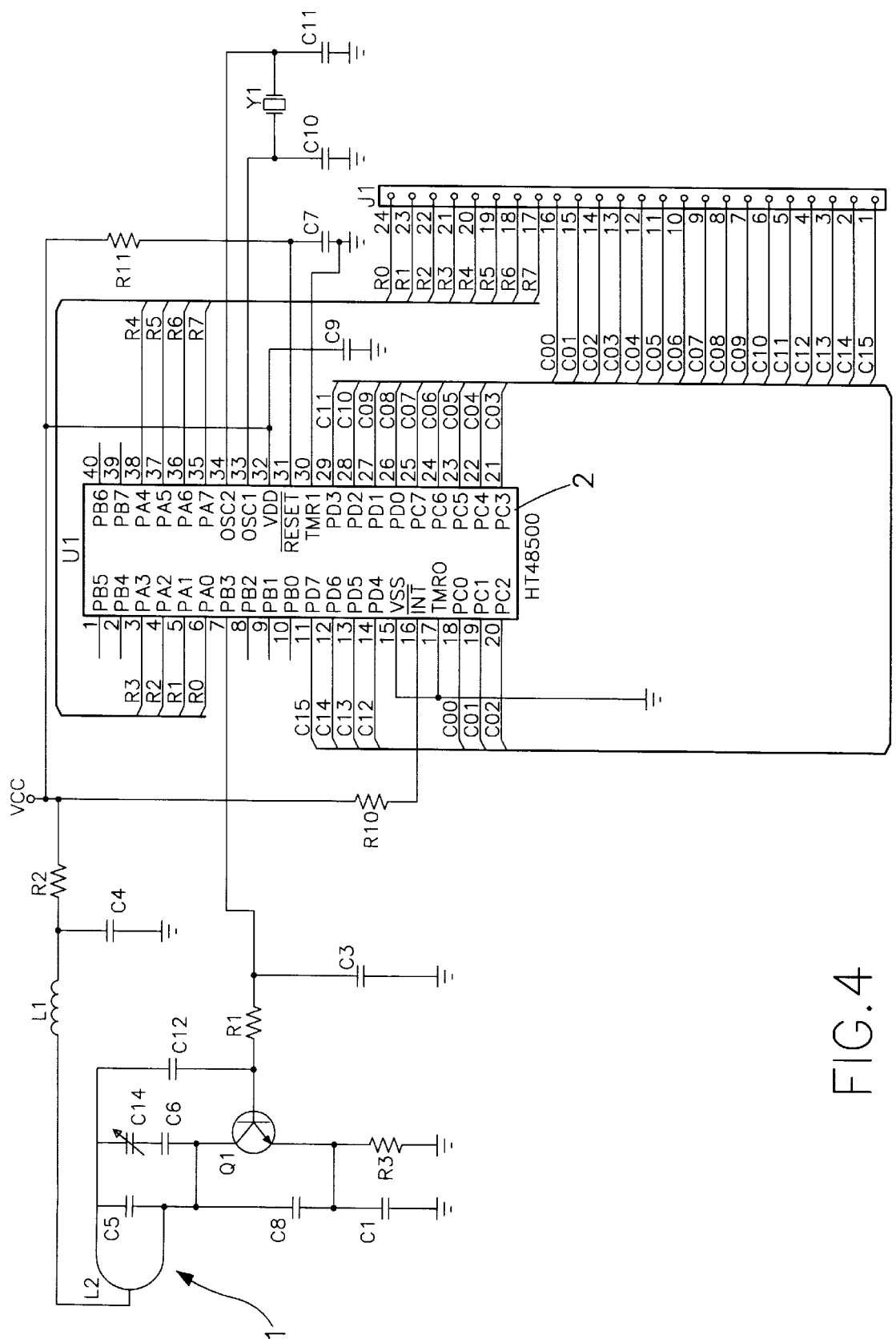
FIG. 4 is the circuit diagram of the RF transmitter shown in FIG. 3 in connection with a controlling IC.

FIGS. 3 and 4 show the circuit diagram of the second embodiment of the present invention. As shown in this figure, the RF transmitter 1 also adopts LC oscillation scheme and ASK modulation. The oscillation is generated by the oscillation tank circuit comprising an inductor L2, capacitors C5, C6 and C14, wherein the inductor 12 is an arc-shaped copper coil formed on the PC board to provide an adjustable and minute inductance, the capacitor C14 is an adjustable and minute capacitor, whereby the frequency of the transmitted signal can be adjusted by adjusting the capacitance of the capacitor C14.

To sum up, the inventive wireless computer mouse uses simple RF circuit to generate stable RF frequency signal and has the advantages of easy manufacture, high yield, low cost and omni-direction emission.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A radio frequency (RF) computer mouse having a RF transmitter using amplitude-shift keying (ASK) modulation for sending signal, said RF transmitter comprising:

a high-frequency transistor, the base thereof being connected to the output of the controlling integrated circuit (IC) of a computer mouse;

a surface acoustic wave device connected to said base of said high frequency transistor;

an liquid crystal (LC) high frequency suppressing circuit connected to the collector of said high frequency transistor;

a circuit component with matching impedance to antenna connected to said collector; and a resistor connected to the emitter of said high frequency transistor for determining the magnitude of current through the oscillator;

whereby said RF transmitter generate stable signal of RF frequency without calibration.

2. The RF computer mouse as claim 1, wherein said controlling IC is a micro processor.

3. A RF computer mouse having a RF transmitter using ASK modulation for sending signal, said RF transmitter comprising:

a high-frequency transistor, the base thereof being connected to the output of the controlling IC of said computer mouse;

an LC oscillation tank connected to the collector of said high-frequency transistor;

a high frequency suppressing circuit connected to said oscillation tank; and a resistor connected to the emitter of said high frequency transistor for determining the magnitude of current through the oscillator;

whereby said RF transmitter can get desired transmission frequency by adjusting the capacitance in said LC oscillation tank.

4. The RF computer mouse as claim 3, wherein said controlling IC is a micro processor.

5. The RF computer mouse as claim 3, wherein the inductance of said LC oscillation tank can be provided by an arc-shaped copper film on PC board.

* * * * *